United States Patent [19]

Popper et al.

[11] Patent Number: 5,790,873
[45] Date of Patent: Aug. 4, 1998

[54] METHOD AND APPARATUS FOR POWER SUPPLY SWITCHING WITH LOGIC INTEGRITY PROTECTION

[75] Inventors: Jay D. Popper, Jamaica; Richard E. Wahler, Lake Ronkonkoma, both of N.Y.

[73] Assignee: Standard Microsystems Corporation, Hauppauge, N.Y.

[21] Appl. No.: 685,376

[22] Filed: Jul. 23, 1996

[51] Int. Cl.⁶ .................................. G06F 1/26; G06F 1/30
[52] U.S. Cl. .................................. 395/750.01; 395/750.06; 395/750.08; 307/66
[58] Field of Search .................... 395/750.06, 750.08, 395/750.01, 182.12; 364/707, 492; 307/66; 365/226, 229

[56] References Cited

U.S. PATENT DOCUMENTS

| | | | |
|---|---|---|---|
| 3,980,935 | 9/1976 | Worst | 340/173 |
| 4,611,289 | 9/1986 | Coppola | 364/492 |
| 5,230,074 | 7/1993 | Canova, Jr. et al. | 395/750 |
| 5,283,792 | 2/1994 | Davies, Jr. et al. | 371/66 |
| 5,300,874 | 4/1994 | Shimamoto et al. | 320/15 |
| 5,410,713 | 4/1995 | White et al. | 395/750 |
| 5,423,045 | 6/1995 | Kannan et al. | 395/750 |
| 5,450,003 | 9/1995 | Cheon | 323/272 |
| 5,581,772 | 12/1996 | Nanno et al. | 395/750 |
| 5,638,540 | 6/1997 | Aldows | 395/750 |

FOREIGN PATENT DOCUMENTS

| | | |
|---|---|---|
| 0 187 369 | 7/1986 | European Pat. Off. |
| 0 547 862 A2 | 6/1993 | European Pat. Off. |
| WO 90/06552 | 6/1990 | WIPO |

*Primary Examiner*—Gopal C. Ray
*Attorney, Agent, or Firm*—Meltzer, Lippe, Goldstein, Wolf & Schlissel, P.C.

[57] ABSTRACT

A method and apparatus for providing power management functions in a computer or other electronic system which includes a primary power supply, a trickle power supply and a battery back-up power supply. A power management circuit includes a storage element which stores an indication of the current turn-on or turn-off condition of the primary power supply. The power management circuit also includes a group of logic gates which process signals which are supplied to the storage element under normal operating conditions to control the turn-on or turn-off condition of the primary power supply. The power management circuit senses when the trickle supply is deactivated due to a line power failure or the like, and subsequently switches the power supply inputs of the storage element and certain of the logic gates from the trickle supply to the battery back-up supply. A blocking signal is generated which prevents those signals which require the trickle supply for logic integrity from being applied to the storage element. In this manner, only signals which do not require the trickle supply for logic integrity are applied to the storage element while the trickle supply is deactivated.

20 Claims, 3 Drawing Sheets

METHOD AND APPARATUS FOR POWER SUPPLY SWITCHING WITH LOGIC INTEGRITY PROTECTION

FIELD OF THE INVENTION

The present invention relates generally to power management functions of computers and other electronic systems. More particularly, the invention relates to power management techniques which provide power supply switching and logic integrity protection and are well-suited for use in a multifunction controller of a computer or other system.

BACKGROUND OF THE INVENTION

In order to minimize power consumption in a computer or other electronic system, it is often desirable to have the ability to switch off the power to certain components when the system is idle for extended periods of time. A conventional power management circuit monitors a keyboard, mouse and other system elements for signs of activity, and shuts down a main system VCC power supply if no activity is detected for a predetermined time period. This places the system in a standby or "sleep" mode of operation. A low-current standby or trickle VTR power supply is typically provided to supply power to standby logic circuitry which causes the system to exit sleep mode in response to a wake-up event such as a keyboard entry or mouse click. This standby logic circuitry may be required to operate with near zero current, on the order of 10 µA or less, when the system is in the sleep mode of operation. The system also typically includes a low-current lithium battery back-up power supply which provides power to system timekeeping circuitry such that date and time information is not lost in the event that both the VCC and VTR supplies are shut down. This situation may arise in a desktop computer as a result of failure or disconnection of a line power source, or in a portable computer as a result of complete discharge of a primary battery power source.

Multifunction controllers have been utilized to provide power management functions in computers and other systems. A typical multifunction controller may include several independent controllers, such as a floppy disk controller, one or more serial port controllers, a parallel port controller, and a keyboard/mouse interface controller, as well as other components such as an embedded microprocessor and a real time clock (RTC). The multifunction controller can readily monitor the activity of the keyboard, mouse and other system elements for activity using the independent controllers in conjunction with well-known interrupt processing techniques. The embedded microprocessor directs the operation of one or more of the controllers, while the RTC provides the above-noted timekeeping functions. A power management circuit in the multifunction controller may provide power supply switching functions, such as the above-noted turn-on and turn-off of the VCC supply in response to events triggering entry and exit of sleep mode.

Conventional power management circuits generally do not provide adequate protection for signal logic integrity when both the main supply and the trickle supply are shut down. As noted above, this situation can arise when the computer or other system in which the power management circuit is installed loses its primary power source due to a line power failure, disconnection or the like, or the discharge of a primary battery source over time. Although the lithium battery back-up supply protects the timekeeping circuitry of the RTC to prevent loss of date and time information when both the VCC and VTR supplies are shut down, the integrity of other logic signals which depend on the VTR supply are usually not adequately protected. For example, many multifunction controllers will allow a user to program an alarm which directs the controller to turn on the VCC supply at a selected time in the future. The RTC generates an alarm signal when the selected time is reached, and the alarm signal is supplied to the power management circuit and used to direct turn-on of the VCC supply. The logic circuitry in the signal path of the alarm signal is generally considered part of the standby circuitry and is therefore powered by the VTR supply. However, if the VTR supply is shut down due to one of the above-noted events, the logic integrity of a previously-programmed alarm may be corrupted. The shut down of the VTR supply may result in the alarm being lost, such that the turn-on event does not occur as programmed. Similar problems arise in the case of other signals which pass through logic circuitry powered by the VTR supply. This loss of signal logic integrity in the event of VTR supply shutdown may be a source of considerable annoyance and inconvenience to the user.

As is apparent from the above, there is a need for improved power management techniques which provide logic integrity protection in the event of power supply loss and are suitable for use in multifunction controllers as well as numerous other devices.

SUMMARY OF THE INVENTION

The present invention provides power management methods and apparatus which permit switching from a trickle supply to a battery back-up supply in a computer or other electronic system, while simultaneously preserving the logic integrity of signals which utilize circuitry normally powered only by the trickle supply. The present invention thus avoids the above-noted logic integrity problems of conventional power management circuits.

An exemplary embodiment of the invention includes a power management circuit for use in a computer or other system having a primary power supply, a trickle power supply and a battery back-up power supply. The power management circuit includes a storage element such as a single D-type flip-flop which stores an indication of the current turn-on or turn-off condition of the primary power supply. The data output of the flip-flop drives an open drain device which generates a signal controlling turn-on and turn-off of the primary power supply. The power management circuit also includes a group of logic gates which process signals which are supplied to the clock, set and reset inputs of the flip-flop under normal operating conditions to control the turn-on or turn-off condition of the primary power supply. In accordance with one aspect of the invention, the power management circuit senses when the trickle supply is deactivated due to a line power failure or the like, and subsequently switches the power supply inputs of the flip-flop and certain of the logic gates from the trickle supply to the battery back-up supply. This provides power to the logic gates which process the signals remaining active in the absence of the trickle supply. Such signals include user-programmed alarm signals generated by a battery back-up powered real-time clock (RTC) within the system.

In accordance with another aspect of the invention, a blocking signal is generated by the power management circuit when the trickle supply is deactivated, and serves to prevent those signals which require the trickle supply for logic integrity from being applied to the clock, set or reset inputs of the flip-flop. In this manner, only signals which do not require the trickle supply for logic integrity are permitted to control the turn-on or turn-off condition of the primary power supply while the trickle supply is deactivated. The present invention thus ensures the logic integrity of any signals applied to the clock, set or reset inputs of the flip-flop while the trickle supply is deactivated. After the line power failure or other trickle supply deactivation event is corrected, the flip-flop will contain an accurate indication of what the current state of the primary power supply should be. The system can then resume normal operation without any concern that certain logic signals, such as a signal based on a user-programmed RTC alarm, may have been inadvertently corrupted by temporary loss of the trickle supply.

DETAILED DESCRIPTION OF THE INVENTION

The present invention will be illustrated below in conjunction with an exemplary multifunction controller. It should be understood, however, that the power management techniques of the present invention are more broadly applicable to a wide variety of other types of electronic systems and devices. In addition, it should be noted that the invention does not require the use of any particular type of logic circuitry. Numerous alternative circuit configurations will be suitable for implementing the described power management techniques. The term "storage element" as used herein is intended to include any device suitable for storing at least one single-bit or multi-bit indicator. The terms "turn on" and "turn off" in the context of switching power supply outputs or other signals are intended to include both turning on and off the sources of the signals as well as disconnecting the signal outputs of the sources. The term "trickle supply" is intended to include any type of power supply which provides power to system circuitry during a standby, sleep or other low current mode of system operation. The term "battery back-up supply" refers generally to any type of battery power source.

Figure 1:
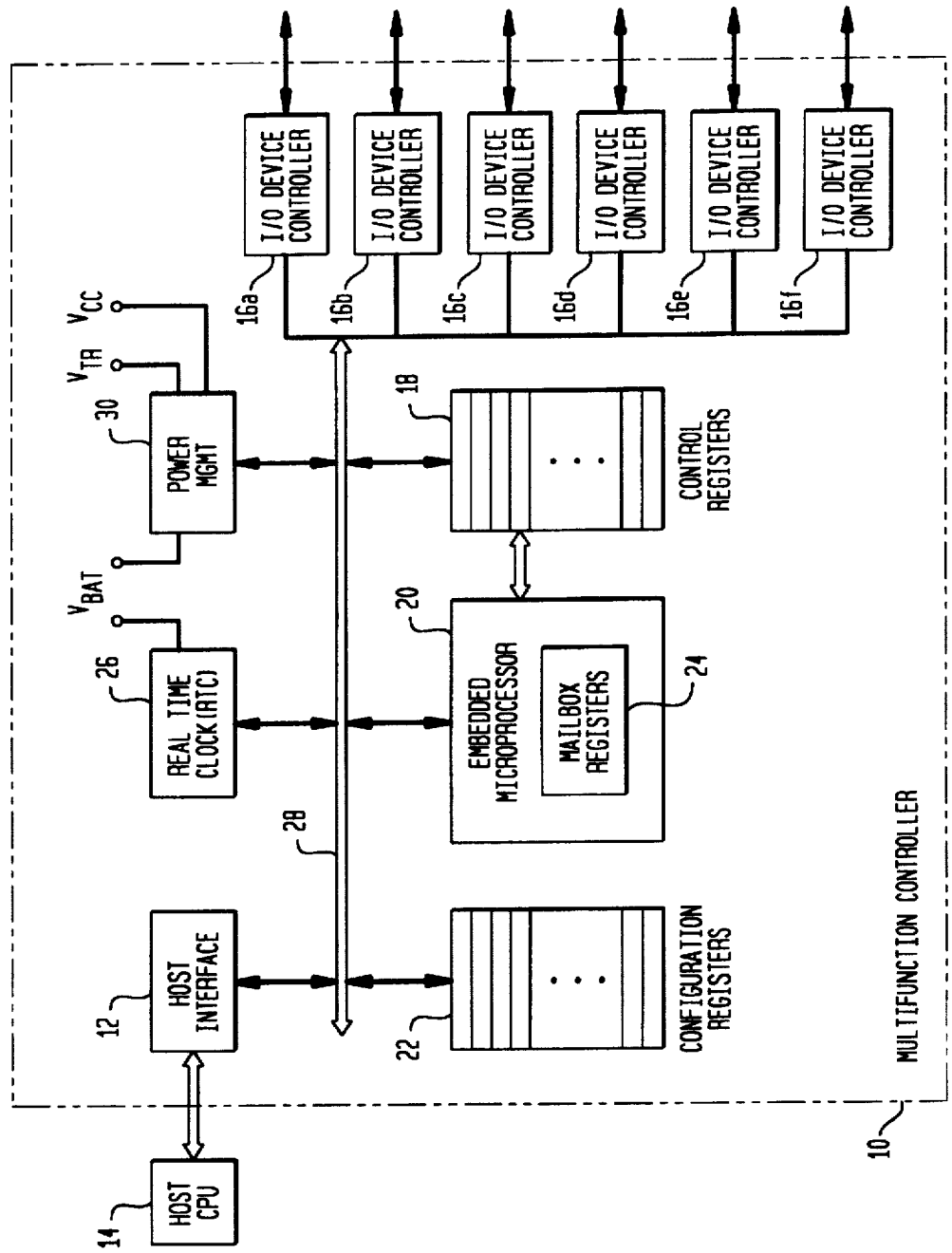
FIG. 1 is a block diagram of an exemplary system including a multifunction controller and an external host central processing unit (CPU). The multifunction controller includes a power management circuit which provides power management functions in accordance with an exemplary embodiment of the present invention.

FIG. 1 shows a block diagram of a multifunction controller 10 in which the power management techniques of the present invention may be implemented. The multifunction controller 10 includes a host interface 12 for interfacing with a host central processing unit (CPU) 14 which is external to the multifunction controller 10. The multifunction controller 10 also includes a number of independent input/output (I/O) device controllers 16a–16f. These device controllers may include a floppy disk controller, a mouse interface controller, a keyboard interface controller, a parallel port controller and several serial port controllers. The operation of the device controllers 16a–16f may be directed in accordance with information stored in a set of control registers 18. One or more of the control registers 18 are associated with each device controller 16a–16f.

The multifunction controller 10 includes an embedded microprocessor 20 which may be an 8-bit microprocessor such as the 8051 available from Intel. The embedded microprocessor 20 directs the operation of the control registers 18, which in turn direct the operation of the I/O device controllers 16a to 16f. The control registers 18 form at least part of the address space of the embedded microprocessor 20. This control register address space may be on the order of 64k bytes. The embedded processor 20 also operates in conjunction with a power management circuit 30 to control certain aspects of power management in the controller 10 and the system in which it is installed. For example, when the system is in a standby or sleep mode, an 8051 microprocessor can enter an IDLE mode of operation during which it stops executing instructions and turns off the clock to its internal CPU, but continues to supply the clock to its interrupt, timer and I/O functions. The internal CPU status may be preserved in its entirety, including the status of all internal registers. When an 8051 microprocessor is in its IDLE mode, its primary clock source may be switched off or otherwise disconnected without causing any operational problems. The IDLE mode of the 8051 microprocessor may be terminated by using either an enabled interrupt condition or a hardware reset. Although it will be apparent that these features of the 8051 microprocessor make it well-suited for use with the present invention, it should be emphasized that these features are not required to practice the invention.

The multifunction controller 10 further includes a set of configuration registers 22. The configuration registers 22 are shown as a single unit in FIG. 1 for clarity of illustration. However, it should be noted that these configuration registers may represent different portions of one or more random access memory (RAM) devices, portions of data or program read-only memory (ROM), as well as various other registers associated with the embedded microprocessor 20. The address space represented by the configuration registers 22 may be on the order of 256 bytes. Also associated with the embedded microprocessor 20 is a set of mailbox registers 24. The mailbox registers 24 may be internal to the embedded microprocessor 20 as in the embodiment of FIG. 1 or external to the embedded microprocessor 20 in alternative embodiments. The mailbox registers 24 are typically utilized to enable the host CPU 14 to access the control registers 18. U.S. patent application Ser. No. 08/661,128 of Steven Burstein, Ian F. Harris and Kenneth G. Smalley, entitled "Bridge Mode" and assigned to the assignee of the present invention, discloses a technique which allows the host CPU 14 to directly access the control registers 18 without intervention of the embedded microprocessor 20. The disclosure of this application is incorporated herein by reference. Other elements of the multifunction controller 10 include a real time clock (RTC) circuit 26 and a power management circuit 30, both of which will be described in greater detail below. The host interface 12, control registers 18, embedded microprocessor 20, configuration registers 22, RTC 26 and power management circuit 30 are all interconnected by a bus structure 28. The multifunction controller 10 may also include a number of other devices not shown in FIG. 1, such as a flash interface and a pulse width modulator.

The present invention provides improved power management techniques which may be implemented in the exemplary multifunction controller of FIG. 1 using the power management circuit 30. As shown in FIG. 1, the power management circuit 30 is connected to the main VCC power supply of the computer or other electronic system in which the multifunction controller 10 is installed. The power management circuit 30 controls application of the main power supply VCC to the other elements of the controller 10 and the system in which it is installed. The power management circuit 30 is also connected to a standby or trickle VTR power supply. The VTR supply is a low-current power supply which remains active in a standby or sleep mode of operation to supply power to standby logic circuitry in the power management circuit 30.

The system in which the multifunction controller 10 is installed may also include a battery back-up VBAT power supply which supplies current to the timekeeping devices in the RTC 26 such that timekeeping functions of the system are maintained when both the VCC and VTR supplies are turned off. The RTC 26 in multifunction controller 10 serves to maintain time-of-day and calendar data. The RTC 26 utilizes a number of ultra-low current devices, such as a 32 kHz crystal oscillator, comparators and voltage references, to provide the capability of maintaining full timekeeping operation using power supplied by the battery back-up VBAT supply in the absence of both the VCC and VTR supplies. As noted above, the VCC and VTR supplies may both be turned off in the event of a line power failure, a power cord disconnection, a complete discharge of a primary battery power source, or other similar events.

The power management circuit 30 operates to place the multifunction controller 10 into a sleep mode in response to certain system conditions, such as a lack of keyboard or mouse activity for a predetermined period of time. During sleep mode, power is conserved by turning off the main VCC power supply or otherwise disconnecting VCC from most current-consuming elements of the multifunction controller 10 and the system in which it is installed. The standby logic of the power management circuit 30, as well as any I/O device controllers 16a–16f required to wake up the controller 10 and the corresponding system, remain powered by the standby VTR supply after VCC is turned off. For example, in a computer system in which a wake-up event may be triggered by clicking the mouse or pressing any key on the keyboard, the I/O device controllers 16a–16f corresponding to the mouse and keyboard should remain powered off the VTR supply such that the wake-up signals can be supplied to the power management circuit 30.

Figure 2:
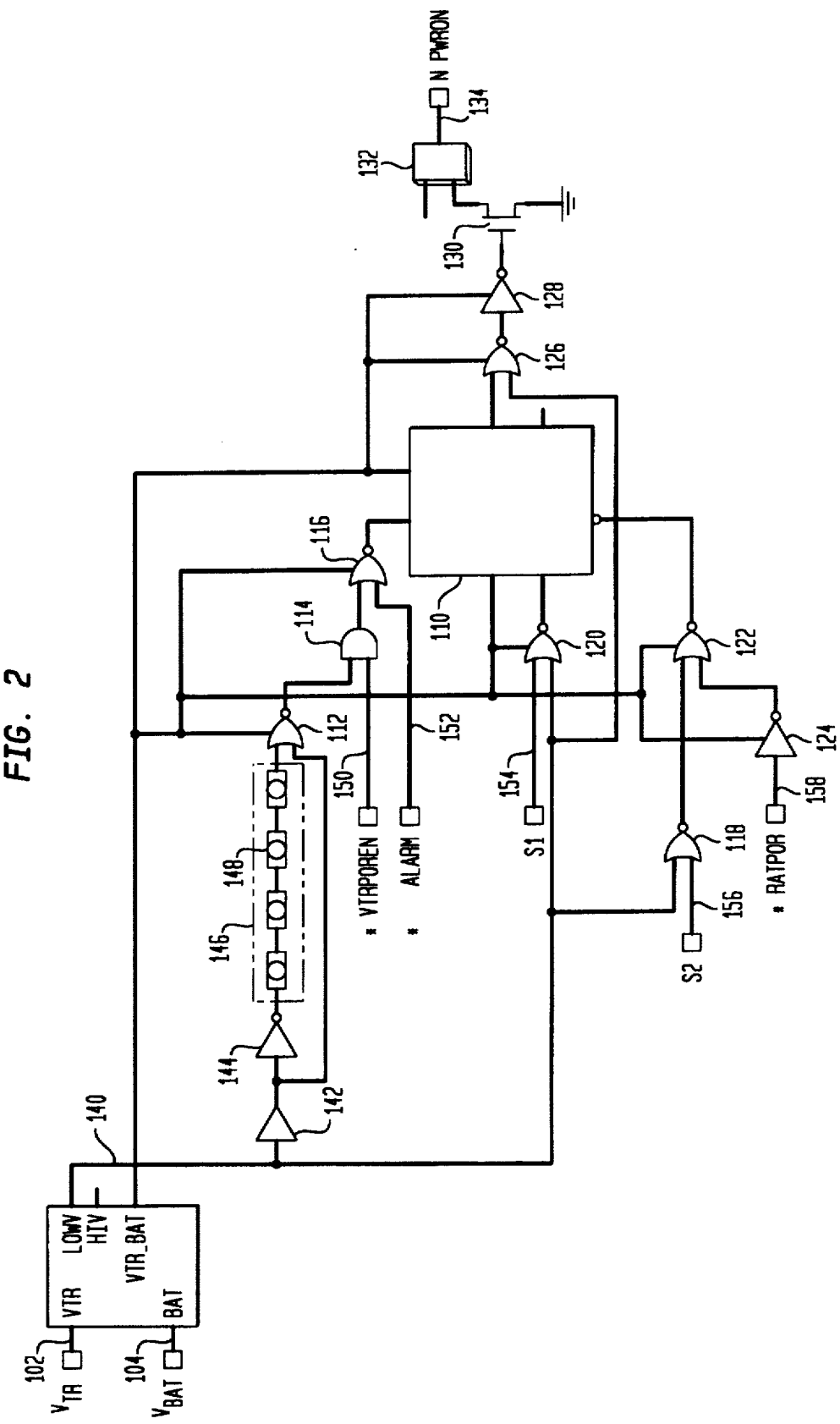
FIG. 2 is a schematic diagram of an exemplary embodiment of a power management circuit in accordance with the present invention and suitable for use in the system of FIG. 1.

FIG. 2 shows a schematic diagram of an exemplary embodiment of a portion of the power management circuit 30 in accordance with present invention. The circuit 30 includes a power control circuit 100 which receives as inputs on lines 102 and 104 the VTR supply voltage and the battery back-up VBAT supply voltage, respectively. The control circuit 100 provides an output VTR_BAT on line 106 which may be either the VTR supply voltage or the VBAT supply voltage. Although the power control circuit 100 is shown as part of the power management circuit in FIG. 2, in alternative embodiments these and other components of the circuit of FIG. 2 may be located in the RTC 26 or elsewhere in controller 10.

Under normal operating conditions, the VTR supply voltage is greater than or equal to the VBAT supply voltage, and the circuit 100 connects the VTR supply to the output VTR_BAT. For example, the VTR supply voltage may be on the order of five volts, while the VBAT supply voltage may be on the order of three volts. When the VTR supply voltage falls below the VBAT supply voltage, as will be the case if the VTR supply is turned off, the control circuit 100 automatically switches the VBAT supply to the VTR_BAT output. As will be described in greater detail below, the control circuit 100 may be configured to switch the VBAT supply to the VTR_BAT output as soon as the VTR supply voltage is within a predetermined range, such as plus or minus ten millivolts, of the VBAT supply voltage.

The output VTR_BAT of control circuit 100 is supplied via line 106 to a power supply input of a power management storage element which in this embodiment is a D-type flip-flop 110. The flip-flop 110 stores an indicator of the last condition determining turn-on or turn-off of the main system power supply VCC. The output VTR_BAT is also supplied to logic gates 112, 114, 116, 118, 120, 122, 124, 126 and 128. The data output of the flip-flop 110 drives one input of NOR gate 126. The output of NOR gate 126 is applied via inverter 128 to an input of an open drain NMOS field effect device 130. The open drain device 130 controls the turn-on and turn-off of the main system supply VCC in accordance with the value stored in the flip-flop 110. A logic low value for the output VCC switching signal NPWRON on line 134 is provided when open drain device 130 is turned on, and serves to turn on the VCC supply. A logic high value for NPWRON is provided when open drain device 130 is turned off, and serves to turn off the VCC supply. A chip bonding pad 132 connects the output of open drain device 130 to the appropriate pin of an integrated circuit package. The data input of the flip-flop 110 is also connected to the VTR_BAT output of the control circuit 100 to provide a constant logic high level data input. The flip-flop 110 also includes a clock input driven by an output of the NOR gate 120, a set input driven by an output of the NOR gate 116 and a reset input driven by an output of the NOR gate 122.

The power control circuit 100 provides on line 140 an output signal LOWV which is at a logic low level when the VTR supply voltage is greater than or equal to the VBAT supply voltage, and at a logic high level otherwise. The signal LOWV is applied via a buffer 142 to one input of the NOR gate 112. The other input of the NOR gate 112 receives an inverted and delayed version of the LOWV signal via inverter 144 and delay line 146. The delay line 146 includes a number of distinct delay elements 148, and in this embodiment provides a total delay on the order of 40 nanoseconds. The output of the NOR gate 112 is a VTR power on reset pulse signal having a logic high level pulse occurring when the LOWV signal transitions from a logic high to a logic low level, which indicates that the VTR supply voltage has risen above the VBAT supply voltage. The pulsewidth is determined by the amount of delay provided by the delay line 146. The pulse signal is applied to one of the inputs of the AND gate 114. The other input of AND gate 14 receives a power on reset enable signal VTRPOREN. The signal VTRPOREN corresponds to a user-programmed control bit supplied by the RTC 26 and maintained by the battery back-up VBAT supply. This control bit is set to a logic high level if the user wishes to set flip-flop 110 whenever the VTR supply is activated. The LOWV signal is also applied via line 140 to the inputs of NOR gates 118 and 120 to prevent the signal S1 on line 154 and the signal S2 on line 156 from being applied to the flip-flop 110 when the VTR supply is turned off. The signals S1 and S2 represent power management signals generated in logic circuitry powered by the VTR supply. The LOWV signal is also applied to an input of NOR gate 126 to prevent the output of the flip-flop 110 from being applied to the open drain device 130 while the VTR supply is turned off.

The signal LOWV is used to prevent those signals for which logic integrity is lost in the absence of the VTR supply from being applied to the inputs of the flip-flop 110. The signal LOWV ensures that when the VTR supply is inactive, only signals provided by battery-maintained logic circuitry are supplied to inputs of the flip-flop 110. The signals provided by battery-maintained logic in this exemplary embodiment are designated in FIG. 2 by an asterisk and include the power on reset enable signal VTRPOREN on line 150, a user-programmed alarm signal (ALARM) on line 152, and a battery power on reset signal (BATPOR) on line 158. The use of the LOWV signal in conjunction with the above-described switching of the VTR_BAT output ensures that the last logic state stored in the power management flip-flop 110 is maintained by the VBAT supply voltage in the absence of the VTR supply voltage.

The operation of the ALARM signal will now be described in greater detail. As noted above, a personal computer or other electronic processing system may be programmed to wake itself up or otherwise turn itself on at some time in the future as specified by user-entered information. The signal ALARM is generated in this embodiment by the RTC 26 of FIG. 1 when the specified time is reached. The main system VCC power supply is turned on in response to a wake-up event indicated by a transition in the ALARM signal from a logic low level to a logic high level. Under normal operating conditions, the VTR supply remains active during sleep mode and the wake-up event indicated by the ALARM signal will occur as specified. However, without the above-described blocking effect of the LOWV signal in conjunction with the supply switching function of the power control circuit 100, a loss of the VTR supply due to a power line failure or other deactivation could negate the wake-up event. The power management circuit 30 supplies the VBAT supply voltage to the NOR gate 116 in the ALARM signal path and to the flip-flop 110, such that the ALARM signal may be applied to the set input of flip-flop 110 via the NOR gate 116. The ALARM signal can thus set the flip-flop 110 to a logic high state in the absence of the VTR supply voltage. This state of the flip-flop 110 may be maintained until the line power is reestablished, at which time the signal NPWRON on line 134 is driven low to thereby activate the main system power supply VCC.

The logic integrity of the signals VTRPOREN and BATPOR are also maintained in the absence of the VTR supply voltage. The signal VTRPOREN is supplied to the set input of the flip-flop 110 via gates 114 and 116, both of which are powered by the VTR_BAT output of the power control circuit 100 via line 106. As noted above, the VTRPOREN signal is supplied by a control bit in the RTC 26 and serves to allow setting of the flip-flop 110 by the above-described VTR power on reset pulse at NOR gate 112 to thereby enable the turn-on of the main system VCC power supply. The signal BATPOR is supplied to the reset input of the flip-flop 110 via gates 122 and 124, both of which are powered by the VTR_BAT output of the power control circuit 100. The BATPOR signal is a pulsed signal supplied by circuitry within the RTC 26 and serves to reset flip-flop 110 if the battery voltage is removed and then reapplied. In accordance with the invention, the integrity of the VTRPOREN and BATPOR signal logic paths is maintained in the event of a line power failure or other event which results in deactivation of the VTR supply.

Figure 3:
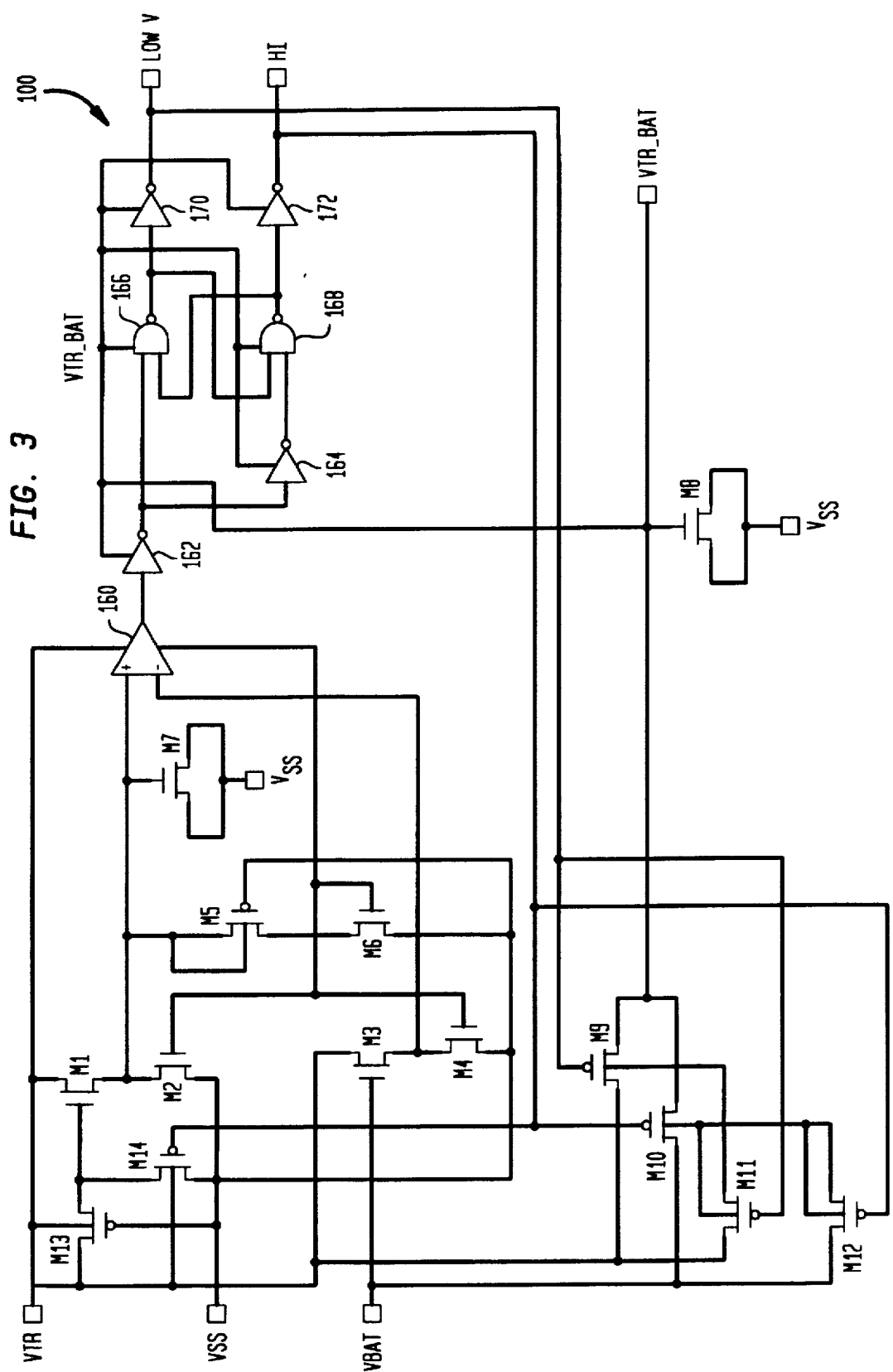
FIG. 3 is a schematic diagram of an exemplary control circuit suitable for use in the power management circuit of FIG. 2.

FIG. 3 is a schematic diagram of the power control circuit 100 of FIG. 2. The control circuit 100 receives as inputs the VTR and VBAT supply voltages. The circuit 100 also receives a VSS input which typically represents a ground potential. N-channel field effect transistors (FETs) M1 and M2 provide a source follower circuit which supplies the VTR supply voltage to a non-inverting input of a comparator 160. N-channel FETs M3 and M4 provide a source follower circuit which supplies the VBAT supply voltage to the inverting input of the comparator 160. The FETs M1 and M3 may each be configured to have a channel width of about 25 µm and a channel length of about 1 µm, while the FETs M2 and M4 may each be configured to have a width of about 2.5 µm and a length of about 1 µm. P-channel FET M5 and N-channel FET M6 provide a bias signal to the comparator 160. In other embodiments, this bias could be provided using circuitry internal to the comparator 160. M5 may be configured to have a width of about 2 µm and a length of about 10.4 µm, and M6 may be configured to have a width of about 10.5 µm and a length of about 1 µm. An N-channel FET M7 is connected between the non-inverting input of the comparator 160 and the ground potential VSS and provides filtering of the VTR supply voltage applied to the comparator input. M7 may be configured to have a width of about 26.7 µm and a length of about 10.7 µm, to thereby provide a capacitance on the order of 1 picofarad.

The comparator 160 provides the above-described comparison of the VTR and VBAT supply voltages, and in this embodiment its output transitions when the VTR supply voltage falls to within approximately 10 millivolts of the VBAT supply voltage. The output of the comparator 160 is applied to an inverter 162. The output of inverter 162 is applied to the input of another inverter 164 and to one input of a NAND gate 166. The output of NAND gate 166 is supplied to an inverter 170 which provides the above-described LOWV signal at the output of circuit 100. The output of inverter 164 is applied to one input of a NAND gate 168, and the output of the NAND gate 168 is supplied to an inverter 172. NAND gates 166 and 168 are interconnected to provide a storage function for the last state of the LOWV signal. The inverter 172 provides at the output of circuit 100 a signal HIV which is the complement of the LOWV signal. All of the gates 162, 164, 166, 168, 170 and 172 are powered by the VTR_BAT output of the circuit 100. An N-channel FET M8 is connected between the VTR_BAT output and the ground potential VSS to provide output filtering. M8 may be configured to have a width of about 396 µm and a length of about 21.3 µm, to thereby provide a capacitance on the order of 20 picofarads.

The LOWV signal at the output of inverter 170 is applied to the gates of P-channel FETs M9 and M11, while the HIV signal at the output of inverter 172 is applied to the gates of P-channel FETs M10 and M12. The VTR supply is connected to the sources of M9 and M11, while the VBAT supply is connected to the sources of M10 and M12. The drains of M9 and M10 are both connected to the output VTR_BAT and in conjunction with the LOWV and HIV signals switch the VTR_BAT output to either the VTR or VBAT supply. M9 and M10 may each be configured to have a width of about 250 µm and a length of about 1 µm. The drains of M11 and M12 are both connected to the well in which the transistors M9, M10, M11 and M12 are formed, such that M11 and M12 serve to maintain the well at either the VTR or VBAT supply voltage in accordance with the state of the LOWV and HIV signals. M11 and M12 may be configured to have a width of about 8 µm and a length of about 1 µm.

The circuit 100 also includes P-channel FETs M13 and M14 which serve to drop the voltage at the gate of M1 when the LOWV signal transitions from low to high. The signal HIV, which represents the complement of LOWV, is applied to the gate of M14. The source of M14 is connected to the gate of M1, and the drain of M14 is connected to VSS. The gate of M13 is connected to VSS, the source of M13 is connected to the VTR supply, and the drain of M13 is connected to the gate of M1. When the LOWV signal transitions from low to high, the HIV signal transitions from high to low, and turns on M14. M13 and M14 then act as a voltage divider between the VTR supply and the gate of M1.

In this embodiment, the M13–M14 voltage divider rapidly drops the voltage at the gate of M1 by about 50 millivolts. The voltage applied by the M1–M2 source follower to the input of the comparator 160 is also dropped, thereby providing enhanced immunity to noise which may be present on the VTR supply line. Switching in the M13–M14 voltage divider thus prevents the output of comparator 160 from improperly changing state due to noise when the VTR supply voltage is close to the VBAT supply voltage. M13 may be configured to have a width of about 4 μm and a length of about 1.2 μm, and M14 may be configured to have a width of about 4 μm and a length of about 10 μm. It should be noted that these and other device dimensions specified above are illustrative examples, and many alternative arrangements will be apparent to those skilled in the art.

A power management circuit in accordance with the present invention may provide other power management functions in addition to those described above. A number of exemplary power management functions suitable for use in conjunction with the present invention are described in U.S. patent application Ser. No. 08/541,642 of Jeffrey C. Dunnihoo entitled "Process and Apparatus for Generating Power Management Events in a Computer System," and U.S. patent application Ser. No. 08/685,378 of Kenneth G. Smalley and Ian F. Harris entitled "Method and Apparatus for Power Management in a Multifunction Controller with an Embedded Microprocessor," both of which are assigned to the present assignee and incorporated by reference herein.

It should be understood that the foregoing description is merely illustrative of the invention. Numerous alternative embodiments within the scope of the appended claims will be apparent to those of ordinary skill in the art.

What is claimed is:

1. A method of switching power supplies in an electronic system including a primary power supply, a trickle power supply and a battery back-up power supply, the method including the steps of:

monitoring the voltage of the trickle power supply; and switching power supply inputs of a first group of logic gates in a power management circuit from the trickle power supply to the battery back-up power supply if the trickle supply voltage falls below the back-up supply voltage by a predetermined amount, wherein the first group of logic gates process signals which determine a turn-on or turn-off condition of the primary power supply, and wherein the condition of said primary power supply is maintained.

2. The method of claim 1 further including the steps of:

generating a blocking signal if the trickle supply voltage falls below the back-up supply voltage by a predetermined amount; and applying the blocking signal to signal inputs of a second group of logic gates which process signals which depend on the trickle power supply for logic integrity.

3. The method of claim 2 wherein the first and second groups of logic gates include at least one gate in common.

4. The method of claim 1 wherein the step of switching power supply inputs further includes the step of switching the power supply input of a storage element which stores an indicator of whether the primary power supply was in a turn-on or a turn-off condition at a time when the trickle supply voltage falls below the back-up supply voltage by a predetermined amount.

5. The method of claim 4 wherein the storage element stores a one-bit indicator which has one value if the primary power supply is in a turn-on condition and another value if the primary power supply is in a turn-off condition.

6. The method of claim 1 wherein the step of switching power supply inputs further includes the step of switching the power supply input of a logic gate which processes a user-programmed alarm signal.

7. The method of claim 1 wherein the step of switching power supply inputs further includes the step of switching the power supply input of a logic gate which processes a power on reset signal for the trickle supply.

8. The method of claim 1 wherein the step of switching power supply inputs further includes the step of switching the power supply input of a logic gate which processes a power on reset signal for the battery back-up supply.

9. An apparatus for switching power supplies in an electronic system including a primary power supply, a trickle power supply and a battery back-up power supply, the apparatus comprising:

a storage element which stores an indication as to whether the primary power supply is in a turn-on condition or a turn-off condition;

a group of logic gates having inputs connected to receive signals which determine a turn-on or turn-off condition of the primary power supply, and outputs coupled to inputs of the storage element; and a control circuit having inputs connected to receive outputs of the trickle power supply and the battery back-up power supply, wherein the control circuit is operative to monitor the voltage of the trickle power supply and to switch power supply inputs of the group of logic gates from the trickle supply to the battery back-up power supply if the trickle supply voltage falls below the back-up supply voltage by a predetermined amount to maintain the condition of said primary power supply.

10. The apparatus of claim 9 wherein the control circuit is further operative to generate a blocking signal if the trickle supply voltage falls below the back-up supply voltage by a predetermined amount, wherein the blocking signal is applied to signal inputs of a second group of logic gates which process signals which depend on the trickle power supply for logic integrity.

11. The apparatus of claim 10 wherein the first and second groups of logic gates include at least one gate in common.

12. The apparatus of claim 9 wherein the control circuit is operative to switch a power supply input of the storage element from the trickle supply to the battery back-up power supply if the trickle supply voltage falls below the back-up supply voltage by a predetermined amount.

13. The apparatus of claim 9 wherein the storage element stores a one-bit indicator which has one value if the primary power supply is in a turn-on condition and another value if the primary power supply is in a turn-off condition.

14. The apparatus of claim 9 wherein the control circuit is further operative to switch the power supply input of a logic gate which processes a user-programmed alarm signal.

15. The apparatus of claim 9 wherein the control circuit is further operative to switch the power supply input of a logic gate which processes a power on reset signal for the trickle supply.

16. The apparatus of claim 9 wherein the control circuit is further operative to switch the power supply input of a logic gate which processes a power on reset signal for the battery back-up supply.

17. An apparatus for switching power supplies in an electronic system including a primary power supply, a trickle power supply and a battery back-up power supply, the apparatus comprising:

a storage element which stores an indication as to whether the primary power supply is in a turn-on condition or a turn-off condition; and a control circuit having inputs connected to receive outputs of the trickle power supply and the battery back-up power supply, a first output corresponding to a first signal indicative of whether the trickle supply voltage has been turned off, and a second output corresponding to the trickle supply if the trickle supply is turned on and corresponding to the battery back-up supply if the trickle supply is turned off;

wherein the first output of the control circuit is coupled to an enable input of a logic gate which is operative to supply the indication to be stored in the storage element, and the second output is coupled to a power supply input of the storage element for maintaining the condition of said primary power supply.

18. The apparatus of claim 17 wherein the control circuit further includes:

a comparator having a first input coupled to the trickle supply and a second input coupled to the battery back-up supply; and a switchable voltage divider coupled between the first input of the comparator and a circuit potential, the switchable voltage divider operative to apply a voltage division to the voltage applied to the first input of the comparator in response to a transition in the first signal at the first output of the control circuit.

19. The apparatus of claim 18 wherein the switchable voltage divider includes at least one field effect transistor having a gate coupled to the first output of the control circuit.

20. The apparatus of claim 17 wherein the control circuit further includes:

a comparator having a first input coupled to the trickle supply and a second input coupled to the battery back-up supply; and a group of logic gates coupled between an output of the comparator and the first output of the control circuit, wherein at least a subset of the group of logic gates include power supply inputs coupled to the second output of the control circuit.

* * * * *